US006802662B1

(12) United States Patent
Cheng et al.

(10) Patent No.: US 6,802,662 B1
(45) Date of Patent: Oct. 12, 2004

(54) NON-LINEAR ERGONOMIC KEYBOARD

(76) Inventors: Cheng Tung Cheng, 415 Clyde Ave., Suite 101, Mountain View, CA (US) 94041; Hung Ying Shih, 3085 Lawrence Expressway, Santa Clara, CA (US) 94065

( * ) Notice: Subject to any disclaimer, the term of this patent is extended or adjusted under 35 U.S.C. 154(b) by 0 days.

(21) Appl. No.: 10/631,292

(22) Filed: Jul. 31, 2003

(51) Int. Cl.[7] .............................. B41J 5/10; G06F 3/023
(52) U.S. Cl. ........................ 400/489; 400/488; 345/168
(58) Field of Search ................................ 400/472, 486, 400/487, 488, 489; 341/22; 345/167, 168; 361/680

(56) References Cited

U.S. PATENT DOCUMENTS

| | | | | |
|---|---|---|---|---|
| 4,244,659 | A | * | 1/1981 | Malt ........................... 400/486 |
| 4,597,681 | A | | 7/1986 | Hodges ....................... 400/488 |
| 5,397,189 | A | | 3/1995 | Minogue ..................... 400/489 |
| 5,426,449 | A | * | 6/1995 | Danziger .................... 345/168 |
| D381,017 | S | | 7/1997 | Burrell, IV ................ D14/115 |
| 5,941,648 | A | * | 8/1999 | Robinson et al. ............. 400/82 |
| 6,059,470 | A | | 5/2000 | Myint ......................... 400/488 |
| 6,088,022 | A | * | 7/2000 | Rakoski ...................... 345/168 |
| 6,547,463 | B1 | | 4/2003 | Loo ............................. 400/472 |
| 2002/0158845 | A1 | * | 10/2002 | Anderson .................... 345/168 |
| 2003/0026066 | A1 | * | 2/2003 | Te Maarssen et al. ...... 361/680 |

OTHER PUBLICATIONS

Master Alfred Huang, "The Numerology of the I Ching: A Sourcebook of Symbols, Structures, and Traditional Wisdom", Publisher: Inner Traditions International, Rochester Vermont, 2000, pp.

"The I Ching", The Richard Wilhelm translation from Chinese into German, rendered into English by Cary F. Baynes, Bollinger Series published by Princeton University Press, NJ, 1967 pp.

\* cited by examiner

*Primary Examiner*—Leslie J. Evanisko
(74) *Attorney, Agent, or Firm*—Elizabeth Chien-Hale (57) ABSTRACT

A keyboard assembly including a non-linear curved keyboard, a base, and optionally a pointing device such as a trackball. The keyboard comprises an elongated base having an upper non-linear surface and a plurality of keys attached to the upper surface. The plurality of keys is divided into several groups and the geometric relationships between the keys are selected such that to allow maximum use of the thumbs and the fingers, the wrists, the forearms, and the shoulders are in a natural position. An asymmetrical element, supported by asymmetrical theory of nature discussed in I-Ching and embodied in the He Tu diagram, may be introduced into the geometry arrangement. The creation of asymmetrical groups are detailed which allow more ergonomic adjustment of the keys, yet preserve the existing geometry of an original keyboard. A trackball may be added in the space between the upper surface and the elongated base.

19 Claims, 10 Drawing Sheets

NON-LINEAR ERGONOMIC KEYBOARD

BACKGROUND

1. Field of invention

This invention relates to an ergonomic keyboard assembly for use with an electronic device such as computers, typewriters or the like; in particular, this invention relates to a keyboard of a curved, non-linear shape onto which keys are arcuately attached to allow the users to maintain their hands in a relaxed position.

2. Description of Related Art

Repetitive Straits Injury ("RSI") to the hands and arms can result from the use of computer keyboards and mice as the usage of computers becomes more essential and extensive in the work place. Repetitive small-motor motions associated with typing can cause damages to tendons, nerves, muscles, and other soft body tissues. Serious victims of RSI may, in the worst case scenario, lose their abilities to perform simple daily tasks such as driving or dressing themselves. Fortunately, RSI is far easier to prevent than to cure by the use of ergonomically designed keyboards.

While it is true that workers in other fields, such as meat packers and musicians, are also sufferers of RSI, frequent users of a standard typing keyboard are most common victims due to motions taken by the fingers on a flat keyboard. Carpal tunnel syndrome is one such injury, and other types of injuries include tendinitis, bursitis, tenosynovitis, tendinosis, DeQuervain's Syndrome, thoracic outlet syndrome, cubital tunnel syndrome.

The conventional keyboard requires the typist to maintain the fingers, hands, wrists, and arms in an unnatural position. Because of the laterally-extended shape of the commonly available keyboards, wrists of the typists are often bent while typing, or serving as a pivot point between the fingers and the forearms as the fingers stretch to reach certain keys After repetitive typing motions, some typists may initially notice tingling and numbness in the fingers. If the conditions are ignored and uncorrected, such symptoms may progress to chronic problems including shooting pains and weakness in the hands and the forearms.

People in the field, such as physical therapist and ergonomics experts, have all pointed out that it is important for a typist's hands be in a straight line with his or her forearms; the natural position is for the hands to be in alignment with the forearms so that the typist's wrists are not bent. Carpal tunnel syndrome, for example, affects the median nerve, which extends down the arm and out to the hand, and is damaging at the point at which the median nerve passes through the human wrist joint. The arched-back position of the hand and wrist required in typing on a conventional keyboard is particularly damaging, in order to reach most keys on a conventional keyboard, the typist must keep the hands parallel to the flat, laterally-extended surface of the keyboard, causing the wrists to be bent or cocked back and upwardly and producing muscle strain in the forearms, wrists and hands. Furthermore, to reach most keys on a laterally extended keyboard, the fingers are not radially aligned with the forearms, forming an angle of ulnar deviation.

Fortunately, the flat design of the keyboard is really more motivated by historical reasons rather than by design concerns. The most commonly known early model of a standard typewriter keyboard was established over 100 years ago. The shape of the keyboard in this early model, with the keys forming an even slope of between 20 & 40 degrees to the horizontal and with diagonal key columns, was determined by the mechanical limitations of the time. The keyboards of other machines, such as the computer, followed the typewriter shape to minimize any learning efforts on the part of the typist. The modern day computer keyboard is mostly completely flat, but maintains the diagonal key columns. The modern electronics has separated the keys from the printing mechanism and it is really old habits rather than substantive concerns that prevented designing keyboards away from the historical laterally-extended shape.

There are many examples in the art for redesigning keyboards in order to allow the user a more natural wrist and hand positions while typing. Such designs have been shown in past U.S. patents and several commercially available ergonomic keyboards. Most of them offer keyboards which are adjustable elevationally or horizontally; some are split keyboards which prevent hand positions which induce ulnar deviation. It is fair to say that most improved designs have the common goal that the hands of the typist will be more directly in-line with the forearms. However, none of these known redesigns fully allow for the complete natural alignment of the finger, wrist and forearms.

Therefore, there is a need for an improved keyboard of ergonomic nature to prevent RSI associated with typists.

SUMMARY

The advantages of this invention include one or more of the following:

This invention provides an easy to use ergonomic keyboard which reduces the stress in the wrists, arms, and shoulders. By allowing the natural alignment of the different body parts that are used for typing, it reduces the likelihood that a typist would develop long term problems from use, especially extensive use, of a keyboard.

Another advantage of this mechanism is that the keys are asymmetrically installed on the keyboard surface, allowing the user to maintain a relaxed position similar to a Tai Chi practitioner's standing stance with both hands in an open position, which again reduces the likelihood that the user's wrists, hands and fingers could be afflicted with repetitive stress injury.

In general in one aspect, the invention provides an asymmetrical ergonomic keyboard assembly; it has a base having a longitudinal axis; an upper surface disposed above said axis, said upper surface forming a convex curve above said longitudinal axis, said upper surface having a first asymmetrical portion and a second asymmetrical portion, wherein a first radial distance from a center point on the longitudinal axis to a point on the first asymmetrical portion is greater than a second radial distance from the center point on the longitudinal axis to a point on the second asymmetrical portion; and a plurality of rows of keys positioned on said upper surface including a first group of keys and a second group of keys are placed on opposite sides of the longitudinal axis and wherein the keys being higher toward the center of the upper surface and lower toward the base.

Implementation of the invention may include the following. The convex surface of the keyboard may be substantially semi-spherical; the surface may be asymmetrically curved about said longitudinal axis; the first group of keys and the second group of keys may include alphabetic keys in adjacent rows; the first group of keys and the second group of keys are not symmetrical along a latitudinal axis on the base; the keyboard assembly may include a tracking device installed on the base; the tracking device may be a trackball; the plurality of rows of keys may include numeric keys and functional keys; and the numeric keys and the functional keys may be positioned between the first group and the second group of keys.

In another aspect, this invention provides an asymmetrical ergonomic keyboard assembly; it has a base with a longitudinal axis; an upper surface disposed above said axis, said upper surface forming a convex curve above said longitudinal axis, said convex curve being substantially semispherical; and a plurality of rows of keys positioned on said upper surface including a first group of keys and a second group of keys which are placed on opposite sides of the longitudinal axis and not equidistant from a user, and wherein the keys are elvationally higher toward a center of the upper surface and lower toward the base.

Implementation of the invention may include the following. The first group of keys and the second group of keys may include alphabetic keys in adjacent rows, and they may be asymmetrical. A tracking device may be installed on the base; the tracking device may be a trackball, or the tracking device may be a wireless device. The plurality of rows of keys may includes numeric keys and functional keys and may be positioned between the first group and the second group of keys.

In another aspect, the invention is directed to a method for a keyboard assembly for inputting electrical signals into a device with processing capabilities. The method includes one or more of the following: forming a base for the keyboard assembly; disposing on top of the base a non-linear surface consisting of at least two portions, said surface encloses the top of the base, mounting a plurality of typing keys on said non-linear surface, wherein alphabetical keys among the plurality of typing keys are roughly divided between the at least two portions of said non-linear surface and wherein the alphabetical keys are positioned asymmetrically. Implementation of the method may include the at least two portions which are asymmetrical portions. The keyboard assembly may further comprise a trackball device.

DETAILED DESCRIPTION

There are different types of keyboards and standards for keyboards vary according to their uses. This invention will be described with reference to a conventional typewriter or computer keyboard, but it will be understood that the principles of this invention can be applied to keyboards for other uses. Conventional typewriter/computer keyboards are usually planar, rectangular in shape. A plurality of rows of keys is attached to a surface spinning across essentially horizontal base and the keys of each row are staggered with respect to the keys of adjacent rows. There can be as few as three, but usually five parallel, horizontal rows with vertical key offsets, forming, or almost forming, diagonal vertical key columns. The characters in the alphabetic sections of the keys mostly follow familiar "QWERTY" pattern, and there are some modifier or function keys at both ends of each row, and/or at the ends of a long spacebar.

In the case of a keyboard of a computer, it is in electronic communication with the computer and the keys on the keyboard are used as an input device. The keyboard of this invention significantly improves the shape of the keyboard to remove injury-inducing stresses by placing keys where fingers naturally rest or can easily reach. Furthermore, key positions allow straight-line alignment of the hands, wrists, and forearms, and putting the upper arms in such position so as to save the shoulders the extra strain of rotation. Keys are further positioned so thumbs, which are least prone to injuries, can be used for striking most non-letter keys.

Figure 1:
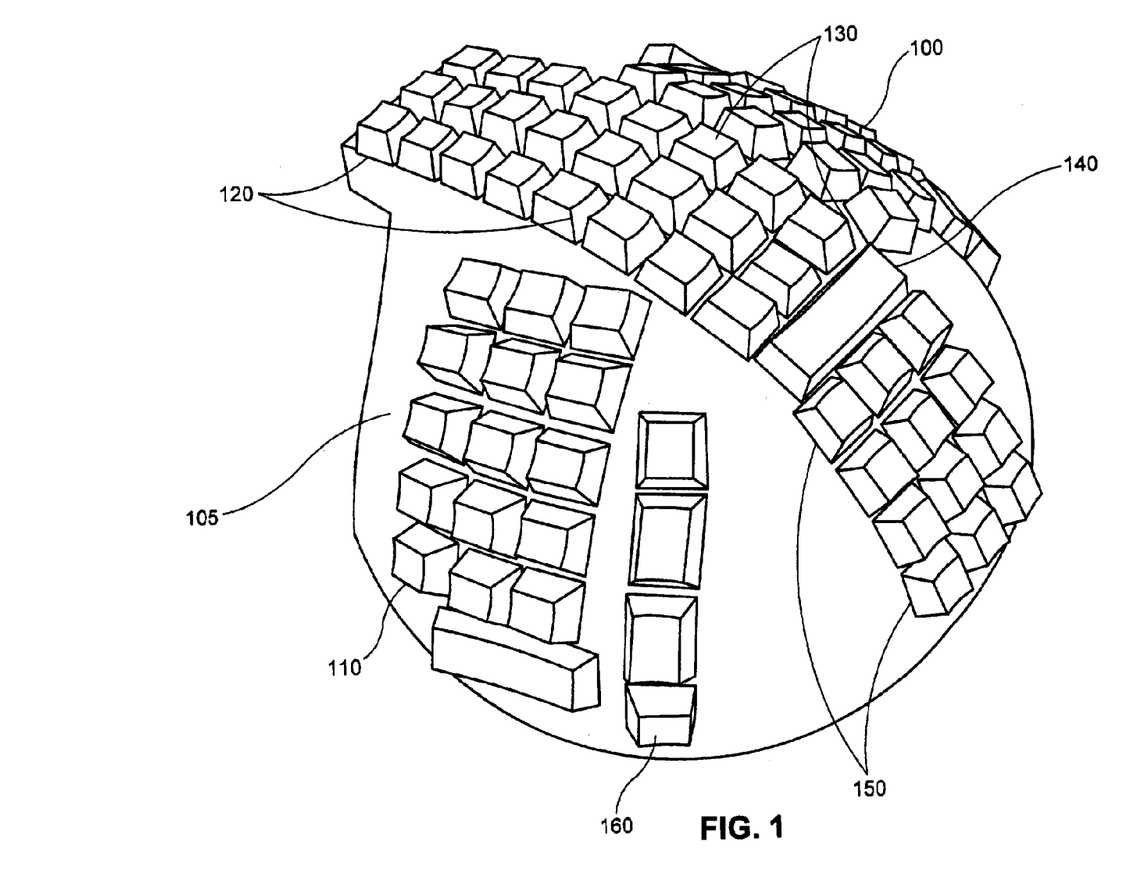
FIG. 1 is an isometric view of one embodiment of a keyboard assembly of the present invention.

Referring to FIG. 1, this new keyboard assembly provides a curved keyboard which allows the user to extend his or her arms toward the keyboard while arms being kept substantially straight. The keyboard comprises an upper non-linear surface 105 which may be of any suitable material, such as wood or plastic, which is of suitable strength. The surface can be spherical or semi-spherical or other shapes, it is shaped such that the keyboard embodying the present invention is non-planar in that the height of the keys above the horizontal base plane increases toward the central keys. It is non-rectangular in that, in each row, the distance of the keys from the user decreases toward the central keys.

Several groups of keys are placed on surface 105: the three rows of alphabetic keys 100 which are typically covered by a user's right hand, the three rows of alphabetic keys 110 which are typically covered by the user's left hand. Keys 100 and 110 are at placed on opposites of the longitudinal axis at the center of surface 105. This arrangement minimizes ulnar deviation of the fingers from the wrist so the fingers and the forearms are in radial alignment. The space bar 140 in one embodiment is placed near the center of surface 105. Along the center of surface 105 are several other groups of key. In one embodiment, five rows of numeric and punctuation keys 120 are grouped in the center positioned farthest away from the user. Three rows of positional arrow keys 130 are positioned next to keys 120 toward the user. Space bar 140 is next, with four rows of functional keys 150 placed closes to the user. These central keys are easy for thumbs to operate, further reduces the possibility of injury. It is understood that these modifying and functional keys can be placed in a variety of ways, and this particular arrangement is for illustration purposes only. The dedicated function keys common to a conventional keypad, such as TAB, CTRL, and the like, can be optionally grouped on both sides of the central keys as key groups 160 and 170.

Figure 2:
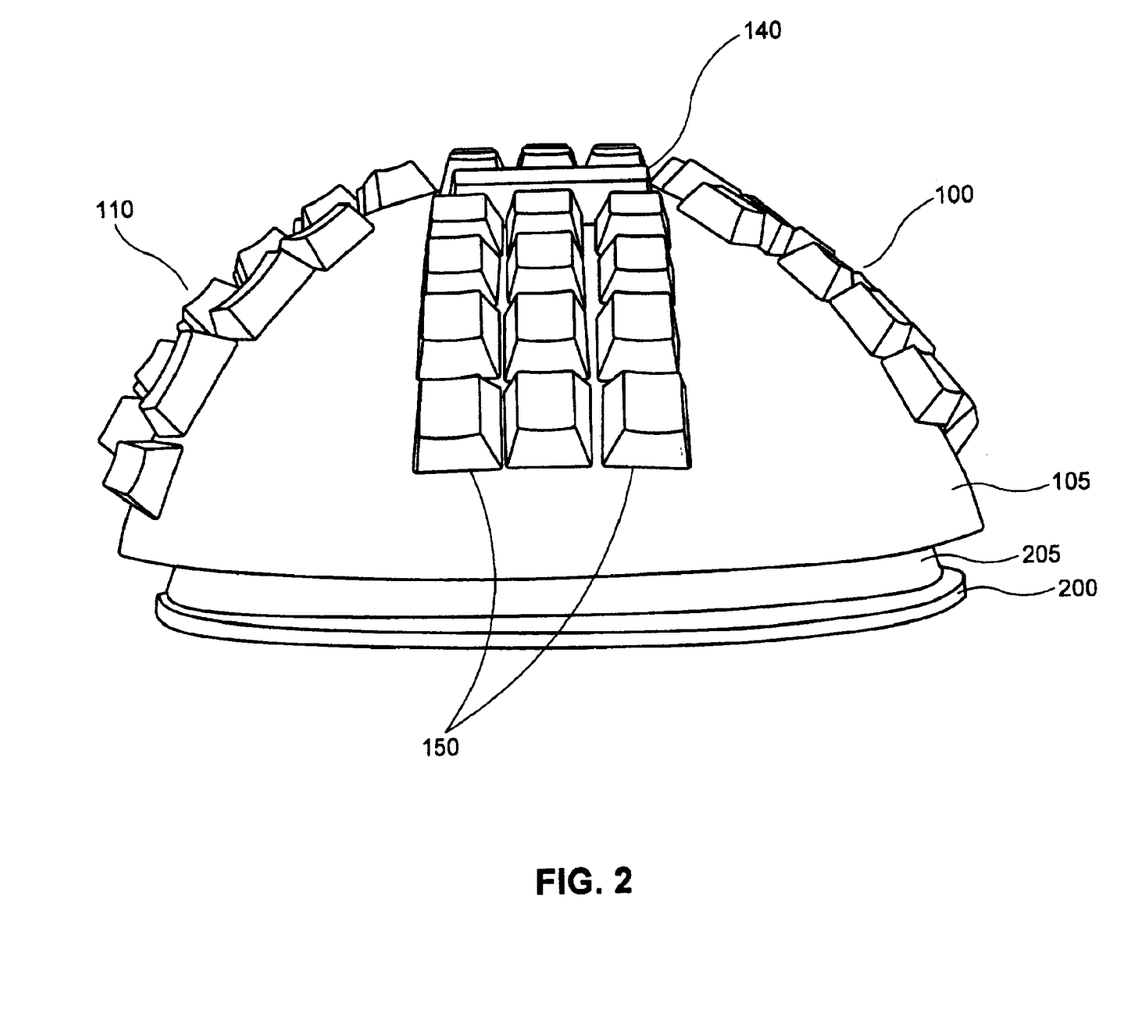
FIG. 2 is a back view of the keyboard assembly incorporating the invention.
Figure 3:
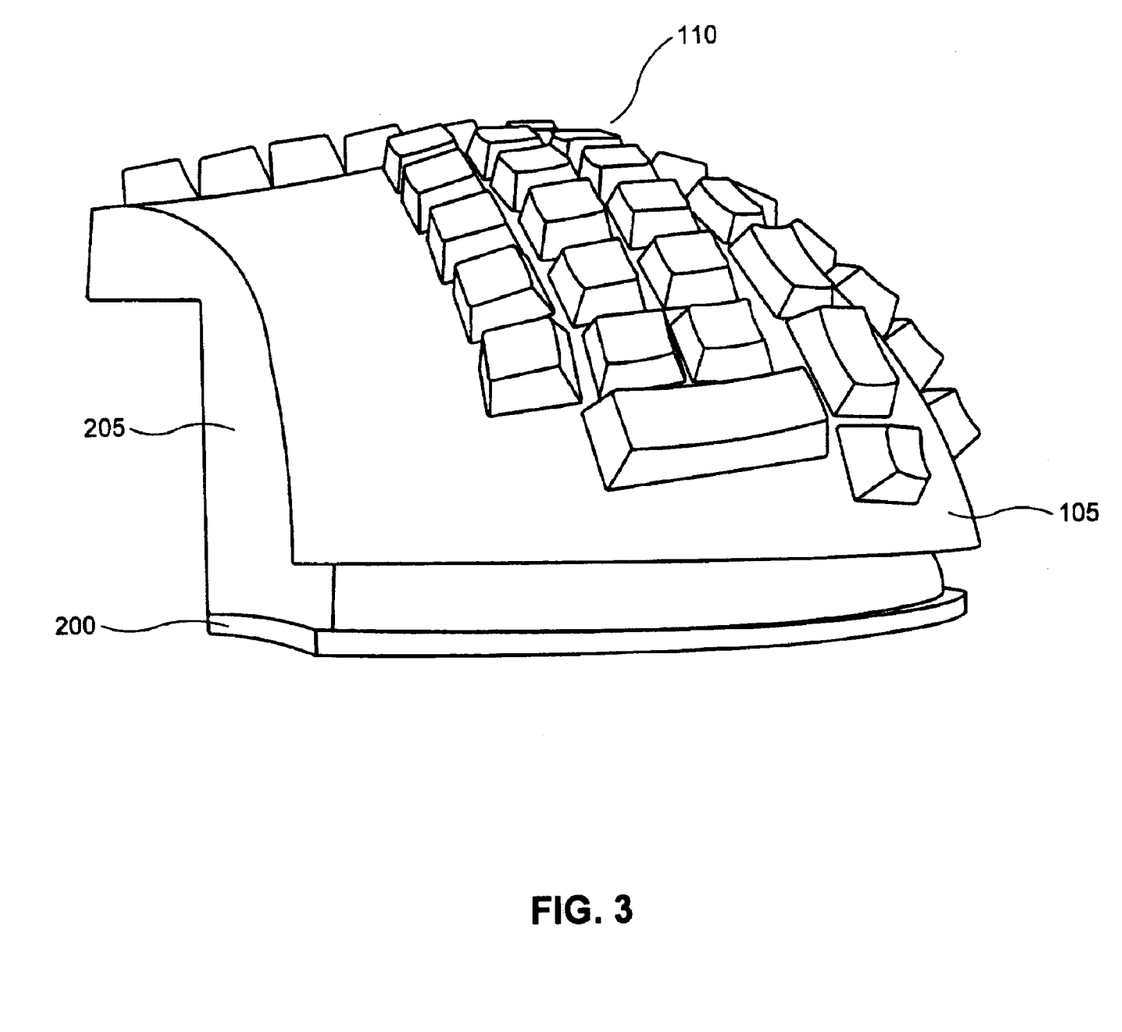
FIG. 3 is a right side view of the keyboard assembly incorporating the invention.
Figure 4:
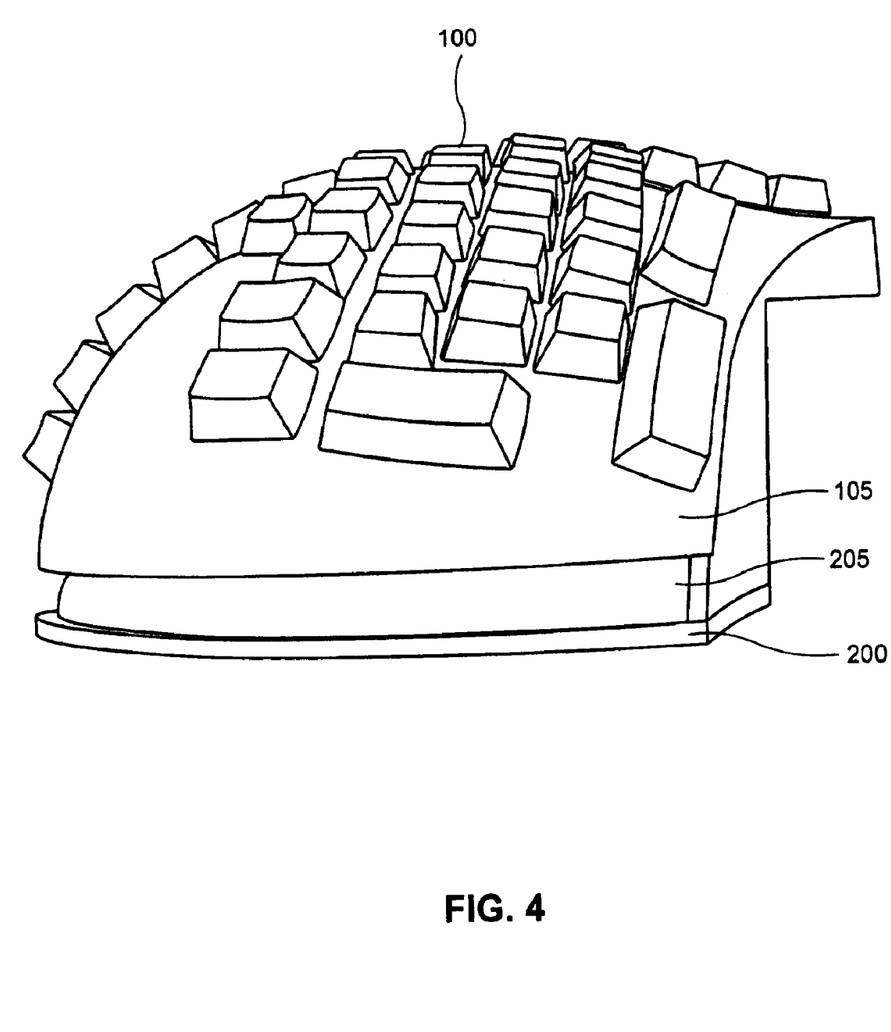
FIG. 4 is a left side view of the keyboard assembly incorporating the invention.

Referring to FIG. 2, a back view of the keyboard assembly is shown. Surface 105 is the upper surface of outer shell 205, which sits on top of base 200. FIG. 3 and FIG. 4 illustrate the side views of the keyboard assembly.

This new keyboard design reduces stress in several ways. By allowing a user's hands to rotate toward a thumb up position, the bones of the lower arms are not twisted together or against each other, thus reducing stress on the wrists and elbows. By shaping the keyboard as described, the wrists are no longer twisted away from the linear axis of the lower arms, but rather are oriented along that axis. By arranging the placement of the keys as described, the fingers no longer have as many varying stroke lengths, thus reducing manual compensation for uneven key stroke length and resultant finger joint fatigue.

There are also formal investigation on the benefits of separating and spacing apart the left-hand and right-hand keys. FIG. 2 clearly illustrates that keys 100 and keys 110 are not co-planar and not contiguous as they would be in a conventional typing keyboard. Studies have been conducted in the context of split keyboard to investigate the effects of separation distance between halves of a split keyboard on wrist radial/ulnar deviation and typing efficiency. The mean ulnar deviations from the conventional setup were 18.9 degrees for the left wrist and 14.2 degrees for the right wrist. The mean ulnar deviations of the split keyboard ranged from 7.0 to 8.4 for the left wrist and 2.7 to 5 degrees for the right wrist. It appears that the ulnar deviation is reduced primarily by the separation of the left-hand and right-hand keys, an effect that keys 100 and keys 110 also achieve and should produce similar reduction in ulnar deviations.

In theory, ulnar deviation less than ten degrees would reduce the risk of carpal tunnel syndrome because there would be less pressure in the carpal canal than if the wrist were deviated ulnarly more than ten degrees. It was also found that when the wrist was deviated more then ten degrees, the pressure in the carpal canal increased from eight mm Hg to over 20 mm Hg. Even pressure as low as 20 mm Hg pressure in the carpal canal could compress the median nerve to a level that might precipitate carpal tunnel syndrome because 20 mm Hg have been shown to reduce axonal transport in a nerve. In addition to reduction in carpal canal pressure, the placed-apart keys 100 and 110 allow wrist to be aligned with the forearm, thereby promoting a neutral wrist posture.

Another advantage of this keyboard assembly design is in the natural hand position. Conventionally laterally-extended keyboards require the user to use static muscular tension to twist the hands into an uncomfortable "pronated" position— with the index finger at the same height as the little finger. The non-linear shape of surface 105 of this keyboard with the descending heights of the keys as measured by base 200 as the keys move away from the center of surface 105, all contribute to reduce the need for the hands to be in pronation. Moreover, conventional keyboards require as much as 40 degrees of wrist motion (left and right) when reaching the cursor control or numeric keypad. Wrist motion requires compression and decompression of the soft tissues, tendons, median nerve, and blood vessels, especially in the carpal canal. Discomfort and injury may result. By placing most modifying, functional, and numeric keys along longitudinal axis in the center of surface 105, far-reaching wrist motions are eliminated.

Figure 5:
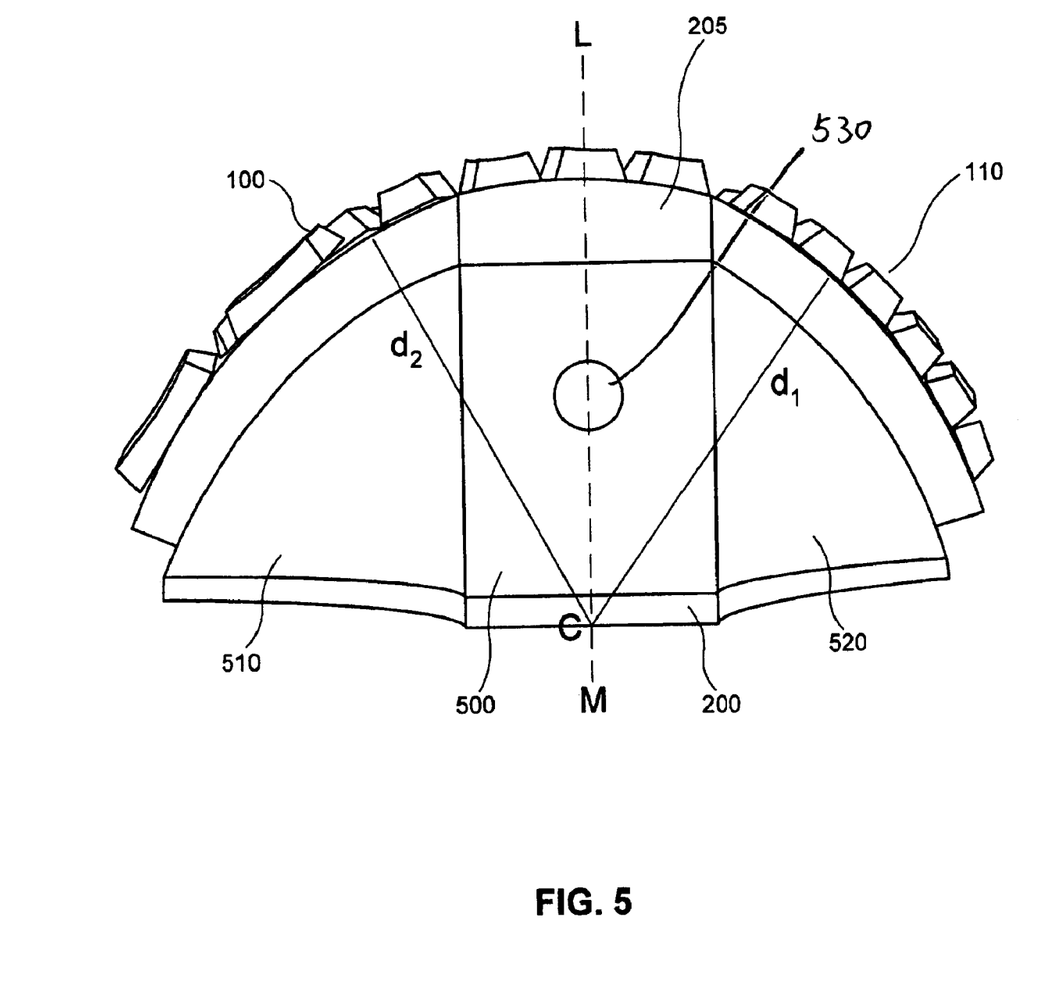
FIG. 5 is a front view of the keyboard assembly incorporating the invention.

Referring to FIG. 5, additional feature of the invention regarding asymmetry is illustrated clearly in the front view of the keyboard assembly. The asymmetry can be shown in (1) the distance between keys 100 and the user, and the distance between keys 110 and the user is different, and in (2) the curvature of the curved surface 105 whereupon the keys are installed. FIG. 5 illustrates the asymmetry of the second kind.

The front side of outer shell 205 can be divided into three parts, a central panel 500, a right panel 520, and a left panel 510. Central panel 500 is essentially rectangular, with axis along L-M line along length at the center of central panel 500. An opening 530 is shown here for an optional wireless subsystem explained below under FIG. 7. Panel 520 is curved, as is panel 510. Furthermore, d1, representing the radius going from point C, which is the center bottom point of panel 500, to any point along the portion of surface 105 supporting keys 110, is not equivalent to d2, representing the radius going from point C to any point along the portion of surface 105 supporting keys 100.

The inspiration and theory of this asymmetrical design came from the ancient text *The Book of Changes*, or *I-Ching*. The ancient Chinese considered numbers to be alive and applied them to medicine and astrology, among other things. Therefore, according to concepts in I-ching and embodied in the He Tu diagram, all things in nature are always changing with two opposite elements which are always asymmetrical. The asymmetrical placements of the two sets of keys keys 100 and keys 110 in this inventive keyboard are the optimal arrangement representing this concept. Such concepts are discussed in detail in *The Numerology of the I-Ching* by Alfred Huang, and *The I-Ching*, translated into English by Cary Baynes from a German translation by Richard Wilhelm. Relevant pages from both books are hereby incorporated by reference.

Figure 6:
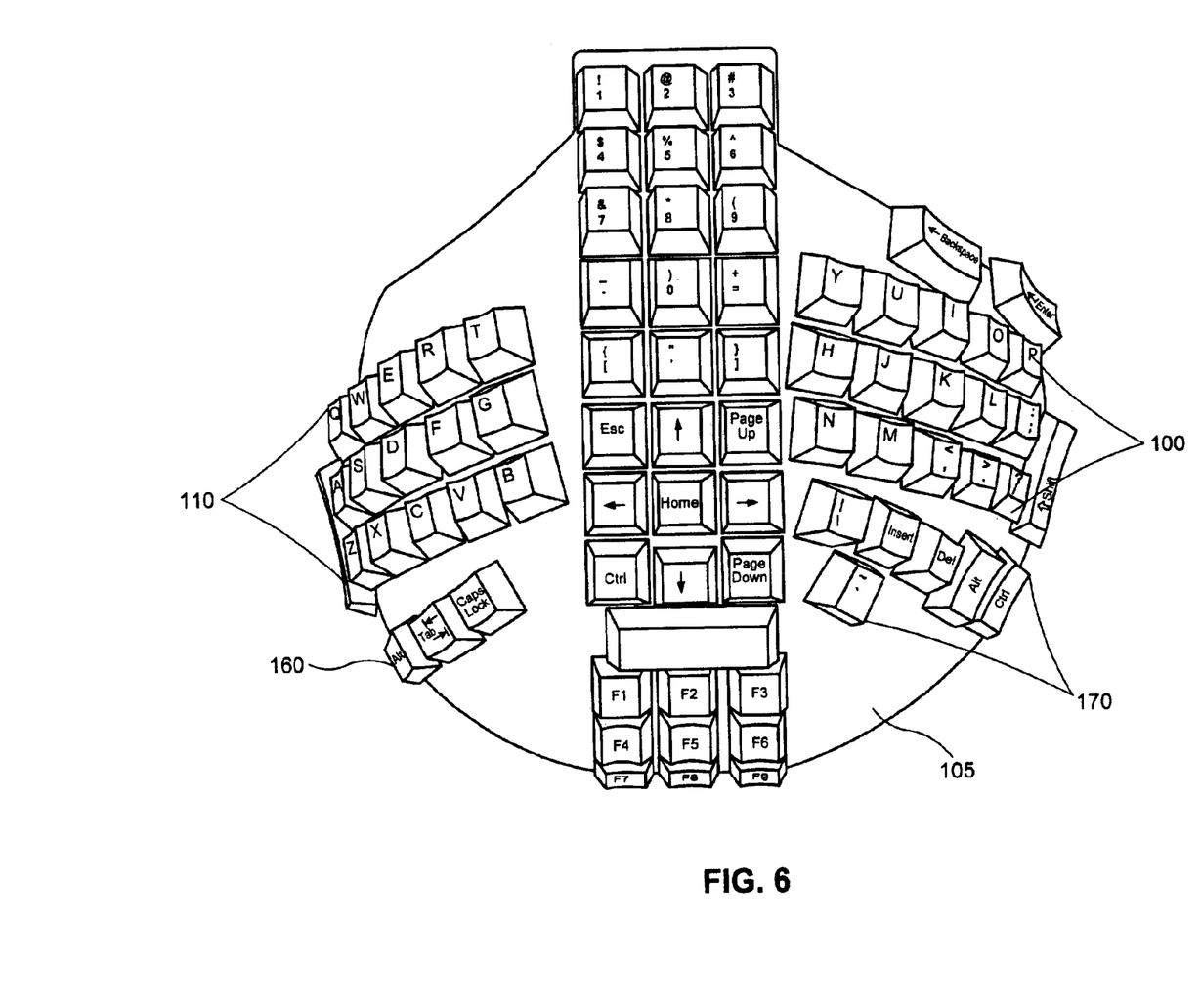
FIG. 6 is a top view of the keyboard assembly incorporating the invention.

FIG. 6 is a top of view of the keyboard and illustrates the asymmetry of the first type. From this view, it can be seen that keys 100 are placed further away from the user than keys 110. In placing hands on these two sets of keys, the hands naturally adopt a front-back position, which is also common posture in the art of Tai Chi. This view also illustrates one possible arrangement of the usual alphanumeric and functions/positional keys on surface 105. It is to be understood that this arrangement is one possible implementation of the concept of this invention and various other types of arrangement are possible without deviating from the spirit and the claims of the invention.

Figure 7:
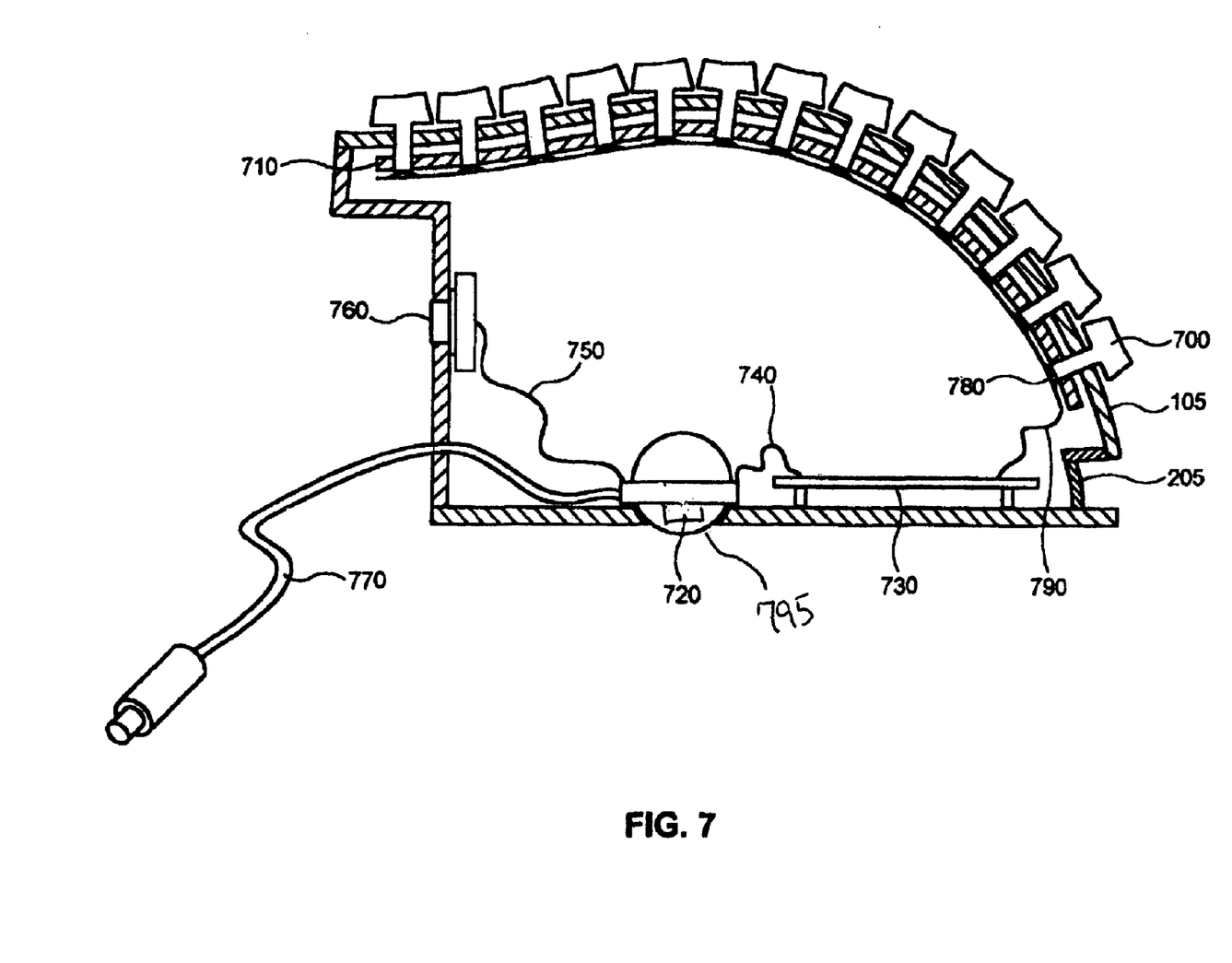
FIG. 7 is a cross sectional view of the keyboard assembly incorporating the invention, showing an optional trackball incorporated therein.

FIG. 7 presents a cross-sectional view of the keyboard assembly. Underneath the plastic cap of each key on the keyboard is a plunger 700 which pierces through the upper surface 105, outer shell 205, inner shell 710, and makes electrical contact through contact bubble 780. Electrical data is then transferred from contact bubble 780 through wire 790 into a processor 730 for processing. The keyboard assembly of this invention may also incorporate additional elements, such as a trackball 795 or a mouse, as shown here. In one implementation, a standard thumb-operated optical trackball using commercially available optical technology can be used for superior precision and accuracy. As shown in FIG. 7, mouse sensor 720, such as infrared cordless sensor, is installed at the bottom of the keyboard with an optional wireless subsystem 760 attached to panels 500, 510, or 520. A small opening in base 200 underneath sensor 720 is required for an infrared or other sensor to detect the movement of any surface textures underneath it. Processor 730 and sensor 720 are in electronic communication through wire 740, and wireless subsystem 760 and sensor 720 are in communication through wire 750. All output of the keyboard is connected to the host computer or other machine through USB connector 770 or the like.

Figure 8:
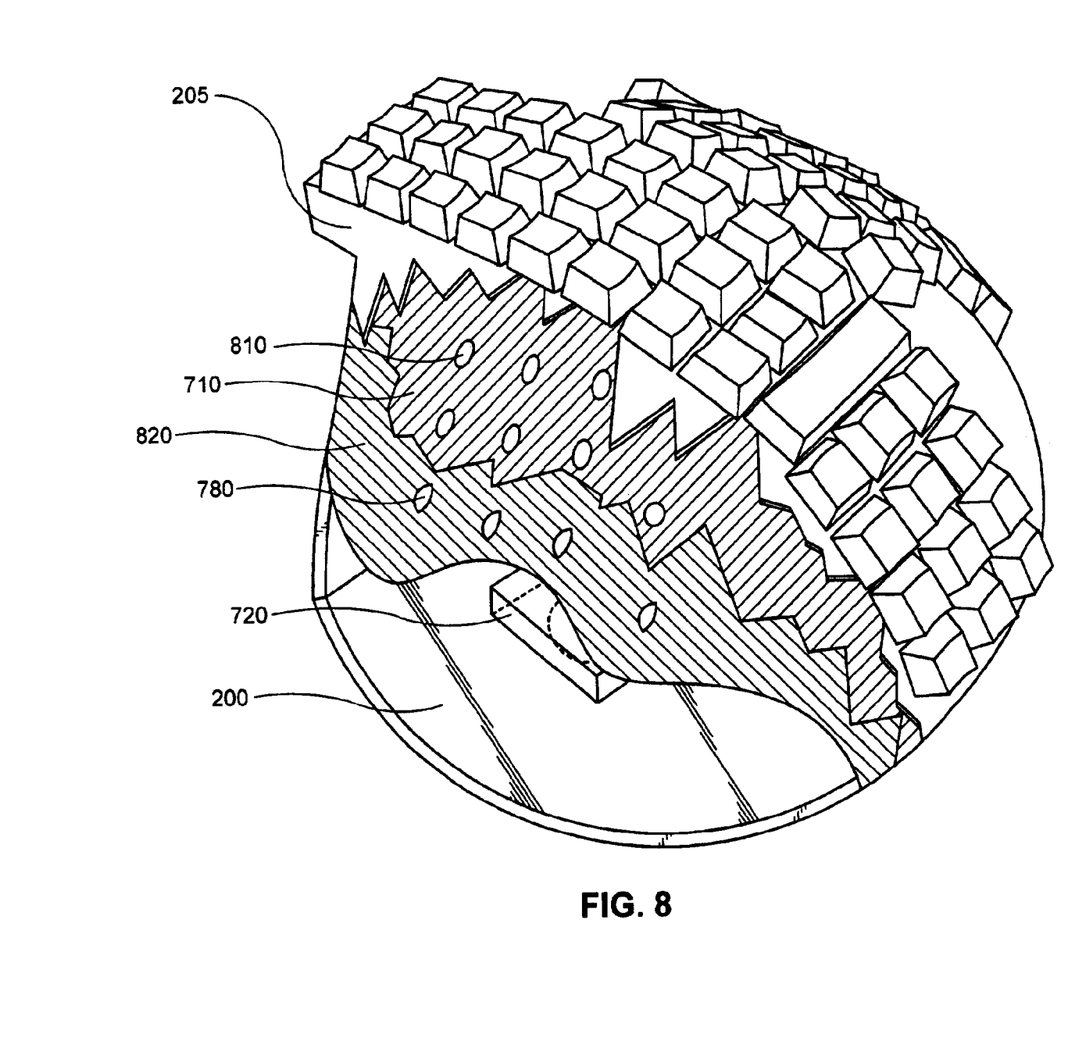
FIG. 8 is the cut-away view showing the keyboard assembly incorporating the invention.

FIG. 8 is the cutaway view of the keyboard assembly. Plungers for each key of the plurality of the keys on surface 105 are attached to outer shell 205, and connect to inner shell 710 through key hole 810. A layer of membrane 820 is between inner shell 710 and contact bubble 780. A different view tracking controller and/or optical device 720 is attached to base 200.

Figure 9:
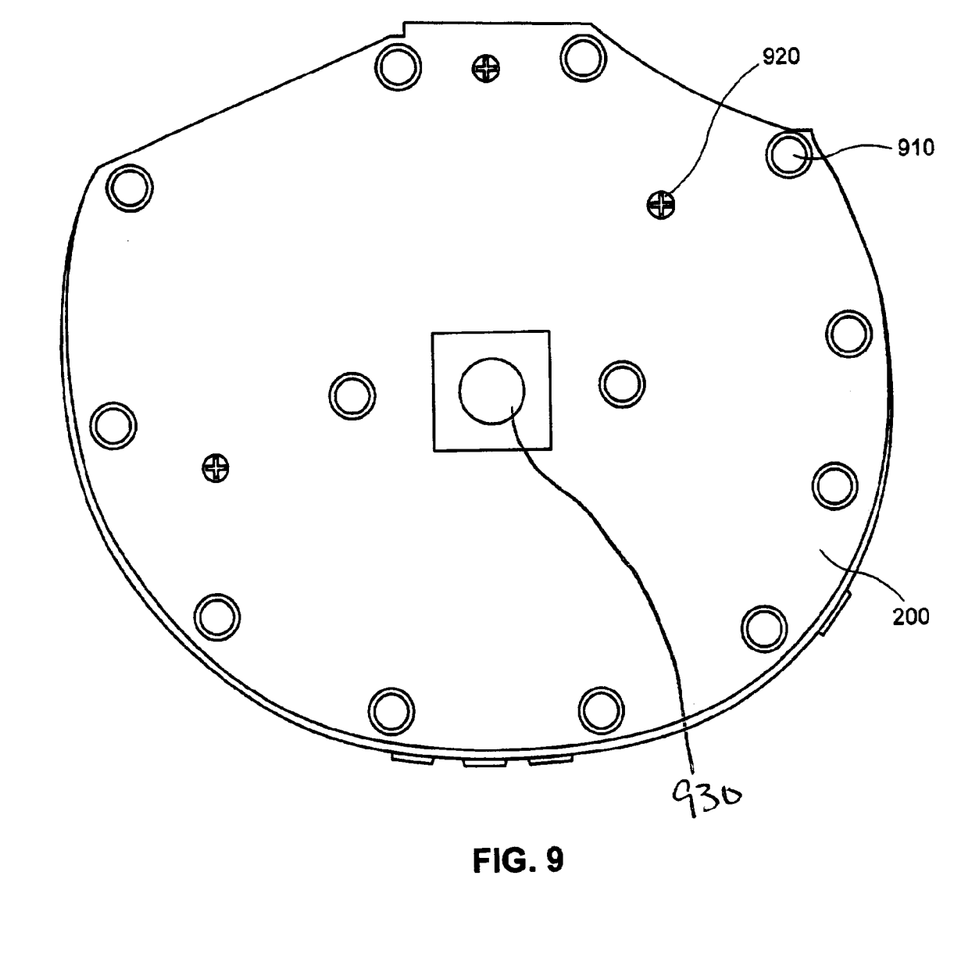
FIG. 9 is a bottom view of the keyboard assembly incorporating the invention.

FIG. 9 is the bottom view of the keyboard assembly. Placed apart are plastic cushion bumps 910 which allow the base to attach to a desk surface or such on which base 200 will be placed. There are also screws 920 shown here on base 200. An opening 930 for sensor 720 is also shown here.

Figure 10A:
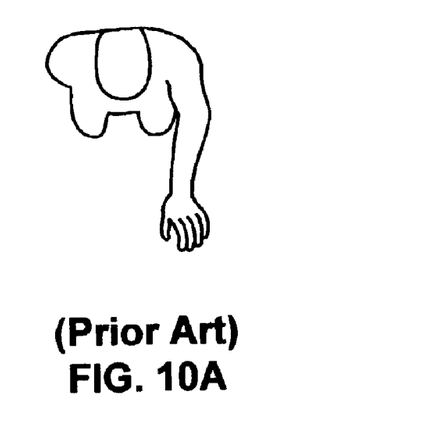
FIG. 10A shows a top view of a user using a prior-art keyboard assembly.
Figure 10B:
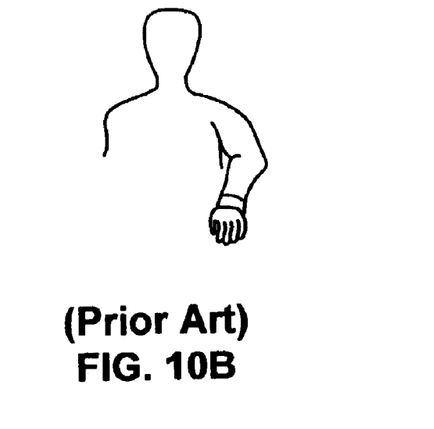
FIG. 10B shows front view of the user.

FIG. 10A illustrates the prior art showing the top view of a user using a conventional, laterally extended keyboard. Note that the hands are the wrists are not aligned and the fingers clearly have to stretch laterally to reach all keys. FIG. 10B is a front view of the position in FIG. 10A.

Figure 11A:
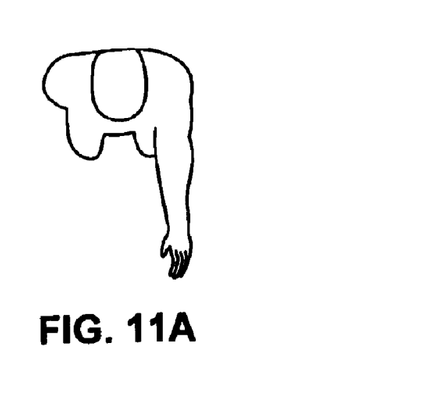
FIG. 11A shows a top view of a user using a keyboard assembly of the present invention.
Figure 11B:
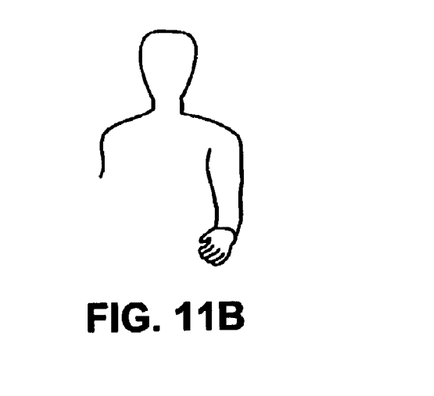
FIG. 11B show a front view of the user illustrating the natural positions of the user's hands, wrists, and shoulders. Like reference numbers and designations in the different figures indicate like elements.

FIG. 11A is the counterpart diagram to FIG. 10A showing the top view of a user using the ergonomic device of this invention. Contrasting the natural finger-hand-wrist alignment of FIG. 11A, it is clear that the almost vertical, cupped position of the hands in using a non-linear keyboard allows for natural alignment of the arms, wrists, and fingers. FIG. 11B shows a front view of the position in FIG. 11A. The natural, relaxed position of the shoulders and the upper arms is most visible in this view, mostly because the palms are almost vertical to the typing surface, as opposed to the parallel position demanded by the prior art device as shown in FIG. 10B In summary, the invention comprises an ergonomic keyboard in which the keys, while maintaining some of the traditional order, are spread out away from the user horizontally and elevationally. In addition, the majority of the letter keys are separated and physically spaced apart into two groups following the traditional divide between the left-hand keys and the right-hand keys. In one embodiment, the two groups of keys are not co-planar nor symmetrical to place the two hands in a front-back position and at different elevation levels. Such features and others help to improve user comfort and reduce likelihood of injury from repetitive muscle stress. In summary, this inventive keyboard eliminated the need to adopt problematic postures induced by the standard keyboard including:

- sustained pronation of the hands,
- sustained abduction of the elbows,
- sustained elevation of the shoulder,
- ulnar deviation,
- extension of the wrist,
- extension and abduction of the little finger and
- extension and adduction of the thumb.

The invention can be applied to any type of keyboard, such as a typewriter keyboard, a computer keyboard, a cash register keyboard, a musical keyboard or a special-purpose keyboard.

The foregoing description of the invention has been presented for purposes of illustration and description. It is not intended to be exhaustive or to limit the invention to the precise embodiments disclosed. Many modifications and variations will be apparent to those skilled in the art. The scope of the invention is defined by the following claims and their equivalents.

What is claimed as new and desired to be protected by Letters Patent of the United States is:

1. An asymmetrical ergonomic keyboard assembly including a non-linear keyboard comprising keys which correspond in designation to a standard keyboard, said keyboard comprising:
   a base having a longitudinal axis;
   an upper surface disposed above said axis, said upper surface forming a convex curve above said longitudinal axis, said upper surface having a first asymmetrical portion and a second asymmetrical portion, wherein a first radial distance from a center point on the longitudinal axis to a point on the first asymmetrical portion is greater than a second radial distance from the center point on the longitudinal axis to a point on the second asymmetrical portion; and
   a plurality of rows of keys positioned on said upper surface including a first group of keys and a second group of keys are placed on opposite sides of the longitudinal axis and wherein the keys being higher toward the center of the upper surface and lower toward the base.

2. The keyboard assembly of claim 1, wherein said convex curve surface is substantially semi-spherical.

3. The keyboard assembly of 1, wherein said convex curve is asymmetrically curved about said longitudinal axis.

4. The keyboard assembly of 1, wherein the first group of keys and the second group of keys include alphabetic keys in adjacent rows.

5. The keyboard assembly of 4, wherein the first group of keys and the second group of keys are not symmetrical along a latitudinal axis on the base.

6. The keyboard assembly of claim 1, wherein a tracking device is installed on the base.

7. The keyboard assembly of 6, wherein the tracking device comprises a trackball.

8. The keyboard assembly of 1, wherein the plurality of rows of keys include numeric keys and functional keys.

9. The keyboard assembly of 8, wherein the numeric keys and the functional keys are positioned between the first group and the second group of keys.

10. An asymmetrical ergonomic keyboard assembly including a non-linear keyboard comprising keys which correspond in designation to a standard keyboard, said keyboard comprising:
    a base having a longitudinal axis;
    an upper surface disposed above said axis, said upper surface forming a convex curve above said longitudinal axis, said convex curve being substantially semispherical; and
    a plurality of rows of keys positioned on said upper surface including a first group of keys and a second group of keys being placed on opposite sides of the longitudinal axis and not equidistant from a user, and wherein the keys being higher toward a center of the upper surface and lower toward the base.

11. The keyboard assembly of 10, wherein the first group of keys and the second group of keys include alphabetic keys in adjacent rows.

12. The keyboard assembly of 11, wherein the first group of keys and the second group of keys are asymmetrical.

13. The keyboard assembly of claim 10, wherein a tracking device is installed on the base.

14. The keyboard assembly of 13, wherein the tracking device comprises a trackball.

15. The keyboard assembly of 13, wherein the tracking device comprises a wireless device.

16. The keyboard assembly of 10, the plurality of rows of keys includes numeric keys and functional keys.

17. The keyboard assembly of 16, wherein the numeric keys and the functional keys are positioned between the first group and the second group of keys.

18. A method for a keyboard assembly for inputting electrical signals into a device with processing capabilities, comprising:
    forming a base for the keyboard assembly;
    disposing on top of the base a non-linear surface consisting of at least two portions, said surface encloses the top of the base; and
    mounting a plurality of typing keys on said non-linear surface, wherein alphabetical keys among the plurality of typing keys are roughly divided between the at least two portions of said non-linear surface and wherein the alphabetical keys are positioned asymmetrically.

19. The method of claim 18, wherein the keyboard assembly further comprises a trackball device.

* * * * *